United States Patent
Osogami

(10) Patent No.: US 11,531,878 B2
(45) Date of Patent: Dec. 20, 2022

(54) BEHAVIOR PREDICTION WITH DYNAMIC ADAPTATION TO ENVIRONMENTAL CONDITIONS

(71) Applicant: INTERNATIONAL BUSINESS MACHINES CORPORATION, Armonk, NY (US)

(72) Inventor: Takayuki Osogami, Yamato (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 976 days.

(21) Appl. No.: 16/278,891

(22) Filed: Feb. 19, 2019

(65) Prior Publication Data
US 2020/0265303 A1  Aug. 20, 2020

(51) Int. Cl.
*G06N 20/00* (2019.01)
*G06N 3/08* (2006.01)
*G06F 17/16* (2006.01)

(52) U.S. Cl.
CPC ........ *G06N 3/08* (2013.01); *G06F 17/16* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2018/0167237 A1 | 6/2018 | Gudovskiy et al. | |
| 2018/0330271 A1* | 11/2018 | Maleki | G06K 9/627 |

OTHER PUBLICATIONS

Mohsen, "A Rank-One Updating Approach for Solving Systems of Linear Equations in the Least Squares Sense", Electronic Transactions on Numerical Analysis, vol. 29, Jan. 2008, pp. 97-115.
Campbell, "3: Sums, Partitioned Matrices and Constrained Generalized Inverse", Generalized Inverses of Linear Transformations, SIAM, Mar. 2009, pp. 46-50.
Stanimirovic, "Computing the Pseudoinverse of Specific Toeplitz Matrices Using Rank-One Updates", Hindawi Publishing Corporation, Mathematical Problems in Engineering, vol. 2016, Jul. 2016, 16 pages.

* cited by examiner

*Primary Examiner* — David R Vincent
(74) *Attorney, Agent, or Firm* — Tutunjian & Bitetto, P.C.; Randy Emilio Tejeda

(57) ABSTRACT

Systems and methods for modelling time-series data includes testing a testing model with a plurality of hyper-forgetting rates to select a best performing hyper-forgetting rate. A model optimization is tested using the best performing hyper-forgetting rate with the testing model to test combinations of hyper-parameters to select a best performing combination of hyper-parameters. An error of the model is determined using the model optimization. Model parameters are recursively updated according to the least squares regression by determining a pseudo-inverse of a Hessian of the least squares regression at a current time stamp according to a projection of the time-series data at the current time stamp and the pseudo-inverse of the Hessian at a previous time-stamp to determine an optimum model parameter. A next step behavior of the time-series data is predicted using the optimum model parameter. The next step behavior is stored in a database for access by a user.

20 Claims, 14 Drawing Sheets

BEHAVIOR PREDICTION WITH DYNAMIC ADAPTATION TO ENVIRONMENTAL CONDITIONS

BACKGROUND

The present invention generally relates to time-series prediction, and more particularly to adaptive modelling of commercial and industrial time-series data.

Various industries can benefit from accurate and efficient time-series prediction tasks, such as, e.g., behavior forecasting for, e.g., supply chain management, anomaly detection, and others. For example, financial services can benefit from increasing efficient market behavior prediction, such as with machine learning solutions. Similarly, industrial anomaly detection during automated quality control inspections can also be improved with more efficient time-series predictions.

SUMMARY

In accordance with an embodiment of the present invention, a method for modelling time-series data is presented. The method includes testing a testing model with a plurality of hyper-forgetting rates and a best performing hyper-forgetting rate is selected. A model optimization is tested using the best performing hyper-forgetting rate with the testing model to test combinations of hyper-parameters and a best performing combination of hyper-parameters is selected. An error of the model is determined using the model optimization with the best performing hyper-parameters. Model parameters are recursively updated according to the least squares regression by determining a pseudo-inverse of a Hessian of the least squares regression at a current time stamp according to a projection of the time-series data at the current time stamp and the pseudo-inverse of the Hessian at a previous time-stamp to determine an optimum model parameter. A next step behavior of the time-series data is predicted using the optimum model parameter. The next step behavior is stored in a database for access by a user.

In accordance with another embodiment of the present invention, a method for modelling time-series data is presented. The method includes testing a testing model with a plurality of hyper-forgetting rates to select a best performing hyper-forgetting rate. A model optimization is tested using the best performing hyper-forgetting rate with the testing model to test combinations of hyper-parameters to select a best performing combination of hyper-parameters. An error of the model is determined using the model optimization with best performing hyper-parameters according to least squares regression. The model parameters are recursively updated according to the least squares regression by determining a pseudo-inverse of a Hessian of the least squares regression at a current time stamp, including: generating a projection of the time-series data at a current time stamp, the projection being orthogonal to a kernel of the Hessian at a previous time stamp, determining that the projection is not equal to zero, and determining the pseudo-inverse of the Hessian at the current time stamp according to the projection, the kernel and the inverse of the Hessian at a previous time-stamp. An optimum model parameter is determined according to the Hessian at the current time stamp and a negative gradient of the least squares regression. A next step behavior of the time-series data is predicted using the optimum model parameter. The next step behavior is stored in a database for access by a user. The model is updated in the memory with the updated model parameters.

In accordance with another embodiment of the present invention, a system for modelling time-series data is presented. The system includes a testing model to test a plurality of hyper-forgetting rates, select a best performing hyper-forgetting rate, test a model optimization using the best performing hyper-forgetting rate with the testing model to test combinations of hyper-parameters and select a best performing combination of hyper-parameters. An optimization system determines an error of a model stored in memory using the best performing hyper-parameters. A parameter updater recursively updates the model parameters according to the least squares regression by determining a pseudo-inverse of a Hessian of the least squares regression at a current time stamp using a pseudo-inversion mechanism according to a projection of the time-series data at the current time stamp and the pseudo-inverse of the Hessian at a previous time-stamp to determine an optimum model parameter and updated the linear model in the memory with the updated model parameters. A behavior modeler predicts a next step behavior of the time-series data according to the updated model parameters. A database in communication with the memory and the parameter updater stores the next step behavior in a database for access by a user.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
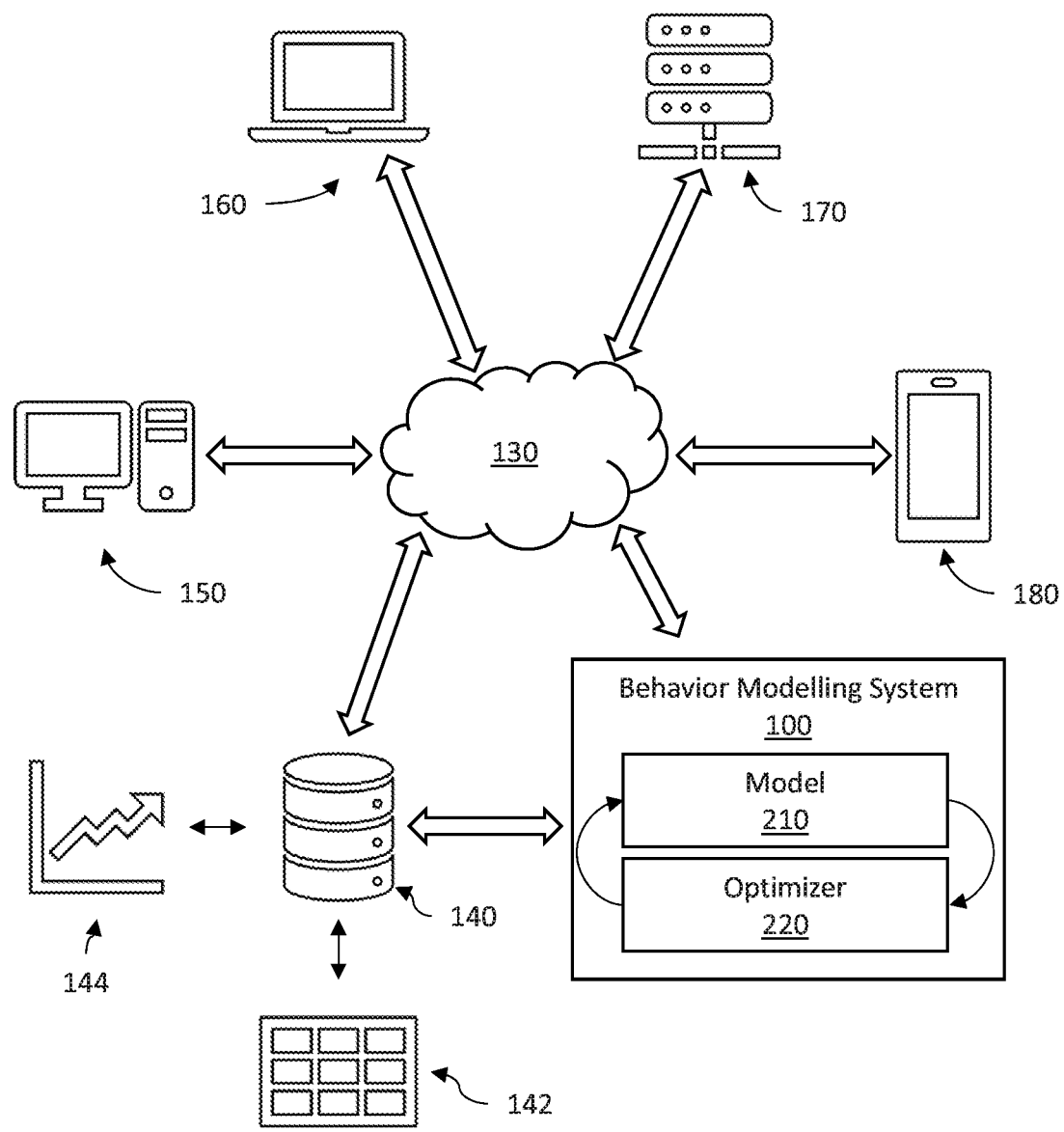
FIG. 1 is a diagram of a system for collecting industry data and generating predictions for decision-making using a processing system with model optimization using recursive pseudo-inversion, in accordance with an embodiment of the present invention.

According to an embodiment of the present invention, a prediction system is described that predicts future behaviors of commercial systems, such as, e.g., agricultural yields, supply chain management, including, e.g., demand trends, yield predictions, logistics, among other applications, including, e.g., financial data including market behaviors, spending behaviors, revenue behaviors, among others, automated quality control data and anomaly detection data, among other time-series.

To deduce a prediction, the prediction system performs linear regression of a time-series of data. However, in agricultural time-series, such as, e.g., crop yields, the data can include non-stationary time-series due to, e.g., unexpected environmental variation. As a result, a forgetting factor for optimization can quickly become inaccurate, leading to overfitting or underfitting a model to the data. Moreover, even where the forgetting factor is appropriate, optimization of parameters can still be inefficient, resulting in large computational complexity from determining regressions.

Therefore, the prediction system incorporates an adaptive forgetting rate and adaptive hyper-forgetting rate to facilitate adaptation to non-stationary time-series. The parameters and forgetting rates are learned through updating upon optimization using the pseudo-inverse of the Hessian of a loss function. The pseudo-inverse is determined through recursive analysis. Such analysis is relatively efficient computationally, thus providing increased rank-one updates for parameter optimization. Moreover, the recursion of the pseudo-inverse accumulates error at a relatively slow rate, thus improving the accuracy of the optimization.

Exemplary applications/uses to which the present invention can be applied include, but are not limited to: prediction of financial market behaviors, quality control anomaly detection, weather forecasting, among other prediction applications.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to the drawings in which like numerals represent the same or similar elements and initially to FIG. 1, a diagram of a system for collecting industry data and generating predictions for decision-making using a processing system with model optimization using recursive pseudo-inversion is depicted according to an illustrative embodiment of the present invention.

According to an embodiment of the present invention, a network 130, such as, e.g., a cloud network, can be implemented to facilitate analyzing industry data. By connecting processing components with information gathering and communicating processing results to end users, the network 130 can be used to improve the efficiency and accuracy of decision-making. Examples of industries in which such a network 130 can be beneficial can include, e.g., supply chain management, financial management, manufacturing, quality assurance, agriculture, among other industries.

Therefore, data can be provided to the network 130 via a database 140. The database 140 maintains records of time varying data corresponding to the industry of interest. For example, supply chain data 144 can be provided to the database 140, including, e.g., sales records at each retail location. Similarly, yield data 142 corresponding to, e.g., agricultural yields, semiconductor fabrication yields, or other manufacturing and production yield data, can also, or alternatively, be provided to the database 140. The yield data 142 can include a record of yields of each crop produced and/or sold by a farm, group of farms, state, region, or other division. Predicting future yields can facilitate improved retail strategies.

In another possible embodiment, the data is provided directly to the network 130 for provision to an end device, such as, e.g., the behavior modelling system 100 in an online manner. Accordingly, the data is transferred or otherwise provided to the behavior modelling system 100 as a real-time stream, where data from the current stage is provided to a device, processed, and deleted. As a result, the data itself is not saved or maintained in any database or log. Such a configuration reduces resource requirements by decreasing the storage of data.

The network 130 can facilitate communication of the supply chain data 144 and/or yield data 142 from the database 140 to other devices, such as, e.g., workstations 150, personal computers 160, private networks 170, mobile devices 180, computing systems 100 and other devices. As a result, a user can access the data 144 and 142 through the network 130 using, e.g., a connected computer, such as the workstation 150, personal computer 160 and/or mobile device 180.

According to one possible embodiment, the behavior modelling system 100 can also be connected direction to the database 140 for quick and efficient communication of data, including the supply chain data 144, yield data 142 and any other time varying data that the behavior modelling system 100 processes. The computer system 100 implements a model 210 to perform the processing of the data.

The model 210 can include, e.g., a model for predicting a next state of a time-series according to learned parameters. The model can be, e.g., a linear model, such as, e.g., an autoregressive model, or the model can include a neural network, such as a convolutional neural network (CNN), a recurrent neural network (RNN) including gated recurrent units (GRUs) or long short-term memory (LSTM), or other neural network configuration. Thus, the data 142 or 144 is provided by the database 140 to the behavior modelling system 100 either directly or via the network 130. The model 210 can generate a feature vector from the data 142 or 144 for input in the model. The model 210 can then generate a prediction of the next state according to the feature vector and the learned parameters.

In one possible embodiment, the behavior modelling system 100 receives yield data 142 including crop yields from each crop of a group of farms, used to sell a product. Profits can be optimized by successfully observing and predicting both crop yields for a coming period of time, as well as crop demand for the coming period of time. Thus, the behavior modelling system 100 uses the yield data 142 to predict both the supply and demand of a given crop for the coming period of time according to a crop yield record. By modeling the crop yield behavior in this way, the behavior modelling system 100 can provide a prediction of the most likely yields for the crop, and adjust farming strategies and retail strategies to maximize sales.

The behavior modelling system 100 can also include an optimizer 220 that analyzes the predicted next state to determine an update to the model using optimum parameters as the learned parameters. Because the data 142 and 144 relate to real-world processes and behaviors, the data 142 and 144 can exhibit non-stationary behaviors. Due to this non-stationary behavior of time-series, the optimizer 220 can incorporate an adaptive forgetting rate to adjust to the amount of data used to optimize the learned parameters. The adaptive forgetting rate can effectively forget data beyond a certain temporal distance back in time in such a way that both over-fitting and under-fitting of the optimization can be avoided. If the forgetting rate is too small, the learned parameters can be under-fit to the data. However, if it is too large, the learned parameters can be over-fit. The balance between over-fitting and under-fitting can vary depending on environmental conditions effecting the data 142 and/or 144. As a result, the adaptive forgetting rate adjusts to environment changes, thus avoiding over-fitting and under-fitting.

The predicted next states can then be provided to users across the network 130. For example, the behavior modelling system 100 can communicate the predicted next state to displays of, e.g., the workstation 150, personal computer 160, mobile device 180, or other displays in communication with the network 130 or the computing system 100. Additionally, the next state can be provided to the database 140, either directly or through the network 130, to be stored for later access.

As described above, the behavior modelling system 100 can operate in an online manner. Thus, the data being modelled is streamed in real-time to the behavior modelling system 100. As data from each stage is received by the behavior modelling system 100, the behavior modelling system 100 uses the model 210 to predicted a next stage. Once the next stage is predicted, the original raw data is no longer needed, and can therefore be discarded to preserve computer resources. However, the behavior modelling system 100 can be configured in a hybrid configuration as well, where data is temporarily stored, or backed-up, among other possible configurations.

Figure 2:
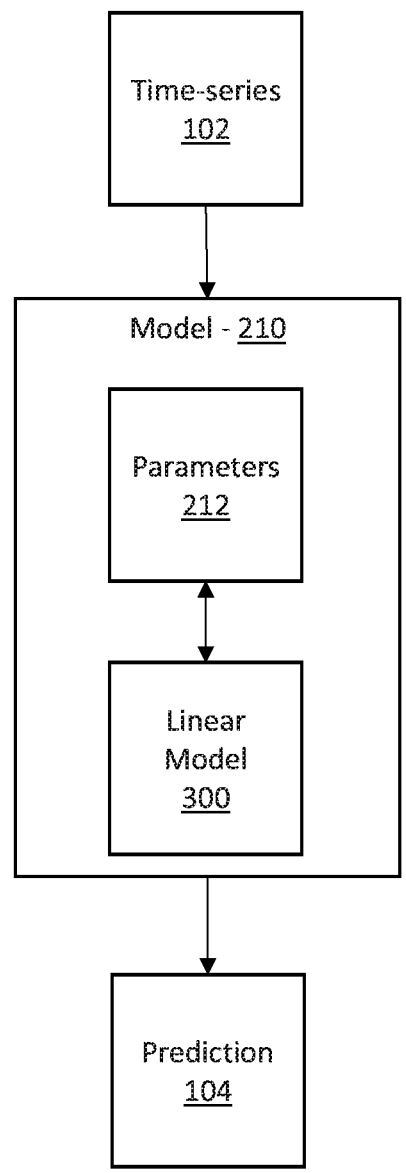
FIG. 2 is a diagram of a behavior modelling system with adaptive parameters, in accordance with an embodiment of the present invention.

Referring now to FIG. 2, a diagram of a behavior modelling system with adaptive parameters is depicted according to an illustrative embodiment of the present invention.

According to an embodiment of the present invention, a time-series 102 of data, e.g., retrieved from a database such as the database 140 described above, is provided to the model 210 of, e.g., a computing system such as the behavior modelling system 100 described above. The model 210 uses the time-series 102 to generated a prediction 104 of a next stage of the data being monitored. According to possible embodiments of the present invention, the data being monitored can include, e.g., market behavior data such as stock market data, yield data corresponding to, e.g., agricultural yields, semiconductor fabrication yields, or other manufacturing and production yield data, or any other time varying data.

The model 210 generates the prediction 104 using a model $f_\theta(x)$, such as, e.g., a linear model 300 along with learned parameters 212, where f refers to the model, θ refers to the parameters and x refers to the observed data points, such as, e.g., a vector of the time-series 102. As a result, the linear model 300 incorporates the parameters 212 to formulate an association amongst the time-series 102. The result of the association formed by the linear model 300 is an output that includes a next data point in the time-series 102 of a not-yet-observed event, such as, e.g., market fluctuation, yield entry, or other event corresponding to the data being measured.

Therefore, the linear model 300 can include, e.g., an autoregressive model, among other suitable linear models for processing time varying data. The parameters 212 can be incorporated into the linear model 300 as, e.g., error values, weight matrices, coefficients, or other aspect of the linear model 300. According to aspects of the present embodiment, the linear model 300 can include an equation such as, e.g., equation 1 below:

$$y_{t+1} = c + A_t y_t + A_{t-1} y_{t-1} + \ldots + A_{t-n} y_{t-n} + e_{t+1},$$ Equation 1 where y is a data entry, A is a time-invariant matrix, e is a vector of error terms, c is a vector of constants or intercepts, t is the timestamp within an epoch of data, and n is the total number of observed data points. Here, the matrix A, errors e and/or the constants c can include weights learned as the parameters 212. As such, a linear model 300 ($f_\theta(x)$) using equation 1 can be learned to predict a next stage using parameters 212.

Figure 3:
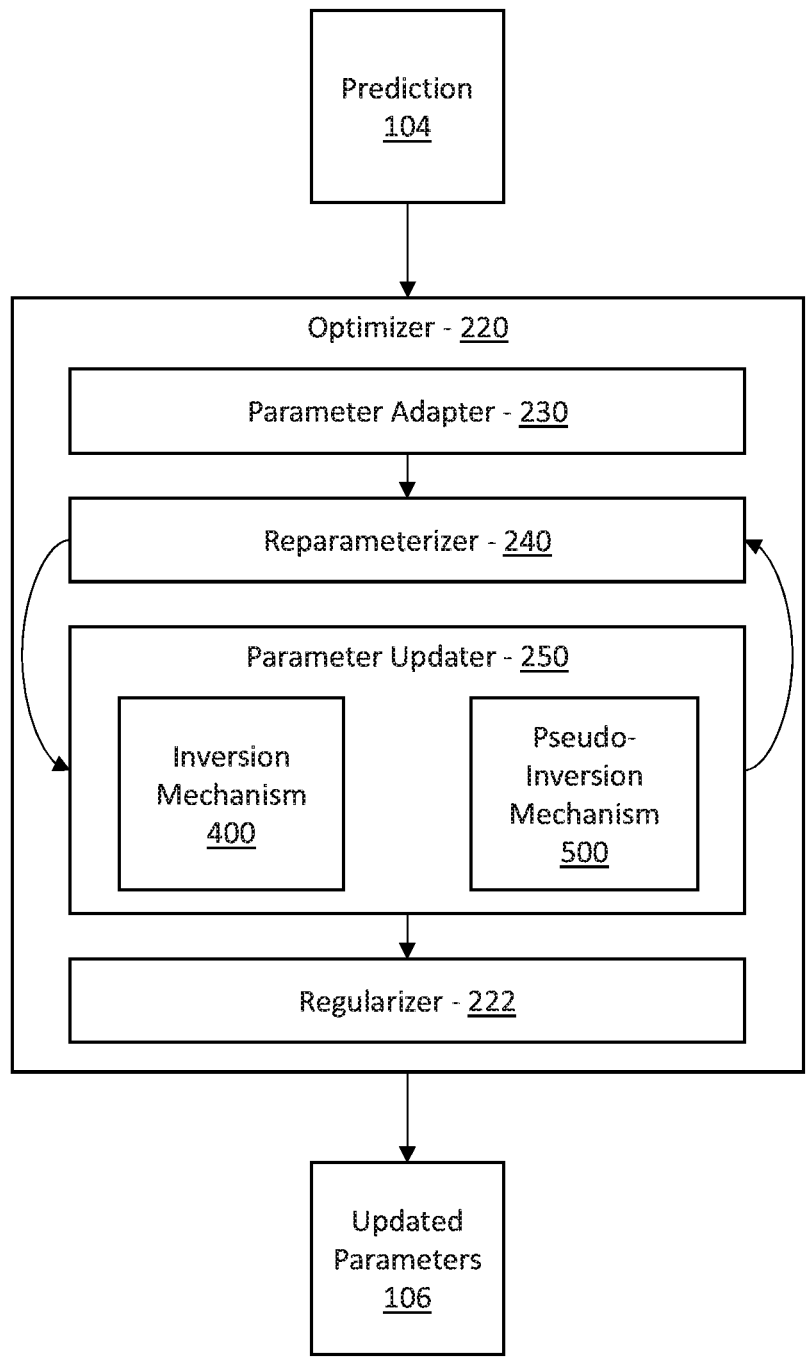
FIG. 3 is a diagram for an optimizer to optimize parameters in the behavior modelling system, in accordance with an embodiment of the present invention.

Referring now to FIG. 3, a diagram for an optimizer to optimize parameters in the behavior modelling system is depicted according to an illustrative embodiment of the present invention.

According to an embodiment of the present invention, an optimizer 220, such as, e.g., the optimizer 220 of the behavior modelling system 100 described above, retrieves the prediction 104 from a model, such as, e.g., the model 210 described above, to determine an error and update parameters 106 of a linear model. The optimizer 220 employs a reparameterizer 240, a regularizer 222, a model evaluator 430 and a parameter updater 250 to generate the updated parameters 106.

According to aspects of the present invention, the optimizer 220 includes online learning for a linear model, such as, e.g., an autoregressive model or other suitable linear model. To perform online learning, the optimizer 220 analyzes the prediction 104 of the model at test time using an error determine technique such as, e.g., least squares including, e.g., recursive least squares for weighted mean squared error, cumulative squared error, or other least squares technique, such as, e.g., equation 2 below:

$$L_t(\theta) = \frac{1}{2} \sum_{d=0}^{t-1} \gamma^d (f_\theta(x_{t-d}) - y_{t-d})^2,$$ Equation 2 where L is the loss, d is the number of observed data points, γ is a hyper parameter including a forgetting rate for weighted means square error, and y is the predicted behavior.

However, to determine error in an online fashion, computationally efficient optimization can be beneficial. The optimizer 220 can employ equation 2 to minimize the parameter θ for more accurate modelling in a computationally efficient way by reparameterizing the optimized parameter θ with the reparameterizer 240. As a computationally efficient way to apply the error determined by the loss function of equation 2 to the optimized parameter θ, gradient descent can be used. For example, by determining a gradient and derivatives of the loss, a new update to the parameter θ can be determined. Thus, the loss L can be modified to form a negative gradient and a matrix of partial derivatives of each element of the matrix of the loss L, e.g., the Hessian of equation 2.

Using a combination of the negative gradient and the Hessian, a new parameter θ is determined according to, e.g., equation 3 below:

$$\theta_{t+1} = H_t^{-1} g_t,$$ Equation 3 where H is the Hessian of equation 2 and g is the negative gradient at the origin.

Thus, the parameter θ can be optimized according to recursive least squares, which is a computationally efficient minimization technique. Moreover, because the parameter θ is defined in terms of the Hessian H of equation 2, the optimized parameter θ can be computed in $O(n^2)$ time, thus further improving the computational efficiency of optimization with the optimizer 220. However, to facilitate preventing over-fitting of optimization, the reparameterized loss function can be regularized with a regularizer 222. For example, the regularizer 222 can impose, e.g., L2 regularization on equation 2 above to reduce the likelihood of overfitting, such as, e.g., using equation 4 below:

$$\grave{L}_t(\theta) = L_t(\theta) + \frac{\lambda}{2}\|\theta\|^2, \qquad \text{Equation 4}$$

where $\grave{L}$ is the regularized loss function, $\lambda$ is a regularization coefficient hyper-parameter.

According to aspects of the present embodiment, the regularization coefficient $\lambda$ and the forgetting rate $\gamma$ can be adapted to non-stationary time-series x. Adaptation can be performed by a parameter adapter 230 which implements, e.g., a follow the leader approach for the hyper-parameters (the regularization coefficient $\lambda$ and the forgetting rate $\gamma$). Accordingly, the parameter adapter 230 determines the most accurate hyper-parameters by determining the most accurate hyper-forgetting rate, and the most accurate hyper-parameters for that hyper-forgetting rate. The parameter adapter 230 can provide the most accurate hyper-parameters to the parameter updater 250 to update the model parameter $\theta$ according to the hyper-parameters $\lambda$ and $\gamma$.

The parameter updater 250 can update both the Hessian H and the negative gradient g to determine the optimized model parameter $\theta$ according to equation 3 above. However, as shown in equation 3, the model parameter $\theta$ depends on the inverse of the Hessian H. Thus, the parameter updater 250 includes an inversion mechanism 400 for determining the inverse of the Hessian H.

However, there are instances where determining the inverse of the Hessian H is impossible or computationally complex. Thus, the pseudo-inverse of the Hessian H can be used in place of the inverse. The parameter updater 250 utilizes a pseudo-inversion mechanism 500 to determine the pseudo-inverse of the Hessian H. The pseudo-inverse can also be determined in $O(n^2)$ time. Thus, efficiency is maintained. Using the inverse and the pseudo-inverse of the Hessian H, the parameter updater 250 can optimize the model parameter $\theta$ as described above. Moreover, the model parameter $\theta$ is optimized according to the efficient and accurate adaptation of hyper-parameters according to non-stationarity in the time-varying data.

Figure 4:
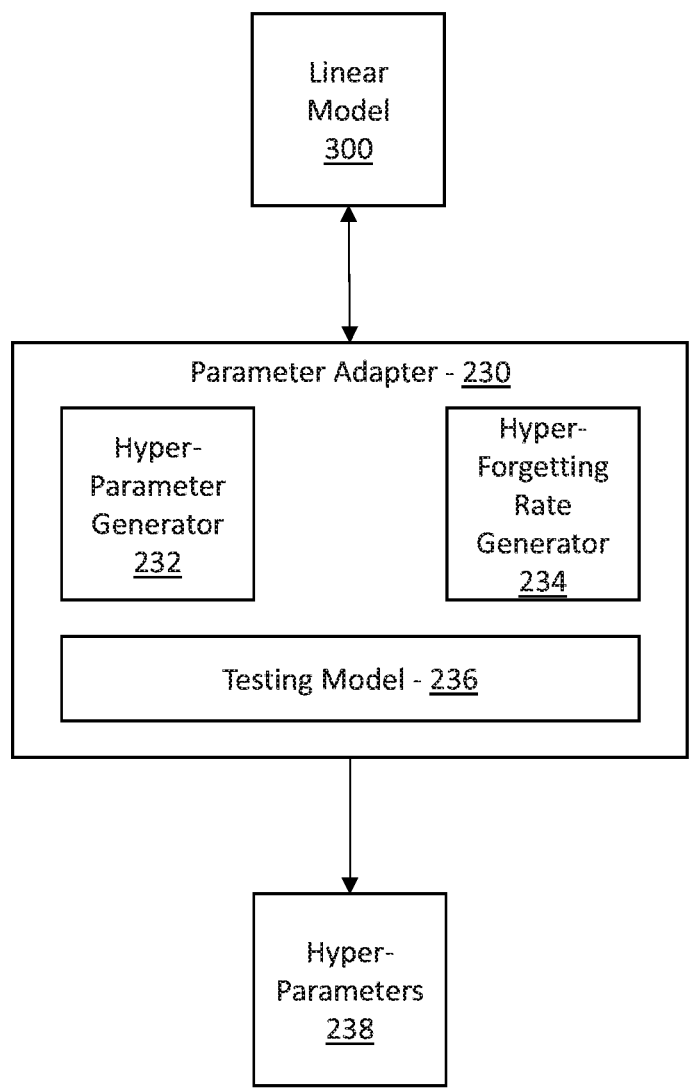
FIG. 4 is a diagram for parameter adapter to optimize hyper-parameters in the behavior modelling system, in accordance with an embodiment of the present invention.

Referring now to FIG. 4, a diagram for parameter adapter to optimize hyper-parameters in the behavior modelling system is depicted according to an illustrative embodiment of the present invention.

As described above, the optimizer 220 can include a parameter adapter 230 to determine the optimal hyper-parameters for model parameter updating, such as, e.g., forgetting rates and hyper-forgetting rates. According to one possible embodiment, the parameter adapter 230 employs a follow the leader approach for the hyper-parameters (the regularization coefficient $\lambda$ and the forgetting rate $\gamma$). Thus, the parameter adapter 230 includes a hyper-parameter generator 232.

The hyper-parameter generator 232 generates a set of possible hyper-parameter combinations with values for both the regularization coefficient $\lambda$ and the forgetting rate $\gamma$ for a given model. To determine the most accurate combination of hyper-parameters, the model can be evaluated with each combination using a testing model 236 that implements an optimization function for each combination of hyper-parameters according to, e.g., least squares regression, such as, e.g., cumulative least squares, or other suitable technique for quickly and efficiently determining error in a linear model 300.

However, the testing model 236 can incorporate a hyper-forgetting rate for determining a period of relevance for evaluating the combinations of hyper-parameters. Thus, the parameter adapter 230 can further adapt the hyper-forgetting rater of the testing model 236 to improve the optimization of the hyper-parameters by, e.g., generating a set of hyper-forgetting rates with a hyper-forgetting rate generator 234. Each of the generated hyper-forgetting rates can be incorporated into an optimization problem and tested with a corresponding combination of hyper-parameters. According to one possible embodiment, the testing model 236 first tests every generated combination of hyper-parameters from the hyper-parameter generator 232 with each of the generated hyper-forgetting rates from the hyper-forgetting rate generator 234. The testing model 236 selects the best performing combination for each hyper-forgetting rate, and then the testing model 236 can evaluate a model of each selected combination for each hyper-forgetting rate and select the best performing hyper-forgetting rate.

According to one possible embodiment, the model is evaluated with each combination according to cumulative least squares. Thus, the parameter adapter 230 can utilize, e.g., equation 5 below:

$$\text{CSE}_t^i(\eta) = \Sigma_{d=1}^{t-1} \eta(\hat{y}_{t-d}^i - y_{t-d})^2, \qquad \text{Equation 5}$$

where CSE is the cumulative least squares, i denotes a combination of hyper-parameters, $\eta$ is a hyper-forgetting rate, and $\hat{y}$ is the prediction of a model with a given combination of hyper-parameters.

Equation 5 can be computed in $O(n^2)$ time, thus maintaining computational efficiency, while also facilitating adapting the parameters for optimization according to non-stationary behaviors. The hyper-parameters 238 can be determined by minimization of equation 5 with respect to the combinations of hyper-parameters, i. Thus, the hyper-parameters 238 for training the model parameter $\theta$ can be more efficiently and accurately selected, thus leading to more efficient and accurate optimization of the model parameter $\theta$. The linear model 300 can then be updated with the best performing model determined by the testing model 236 to make a prediction for a next stage of behavior in, e.g., supply chain behavior, market behaviors, production yields, among others.

However, the cumulative least square also incorporates a hyper-forgetting rate $\eta$. The hyper-forgetting rate can be adapted as well in a fashion similar to the hyper-parameter adaptation. Thus, the parameter adapter 230 can also include a hyper-forgetting rate generator 234 to generate a set of hyper-forgetting rates. Each combination of hyper-parameters can be evaluated for each of the generated hyper-forgetting rates $\eta$. As a result, upon determining the best hyper-parameter combination i for each hyper-forgetting rate $\eta$, the best hyper-forgetting rate $\eta$ can be determined by minimizing equation 5 with respect to the selection j of hyper-forgetting rates $\eta$. For example, the cumulative square error is determined for each hyper-forgetting rate $\eta$ according to the hyper-parameter combination i that is most effective for that respective hyper-forgetting rate $\eta$.

Thus, the testing model 236 can model the linear model 300 implementing the generated combinations of hyper-parameters. The testing model 236 is optimized with respect to the hyper-parameters, and then optimized with respect to the hyper-forgetting rate that dictates the forgetting rate of the testing model 236. As a result, the model tester 436 can incorporate a second model for testing the linear model 300 with respect to the hyper-parameters and hyper-forgetting rates in an efficient manner to improve the accuracy of the optimization of the linear model 300. The second model can include, e.g., a neural network, a linear model, or other model for learning hyper-parameters. Additional layers for models can be implemented for further adapting each level of hyper-parameters. For example, the testing model 236 can be incorporated into another testing model that learns the hyper-forgetting rate by incorporating a hyper-hyper-forgetting rate. The linear model 300 can then be updated with the best performing model learned and determined by the testing model 236 to make a prediction for a next stage of behavior in, e.g., supply chain behavior, market behaviors, production yields, among others.

Figure 5:
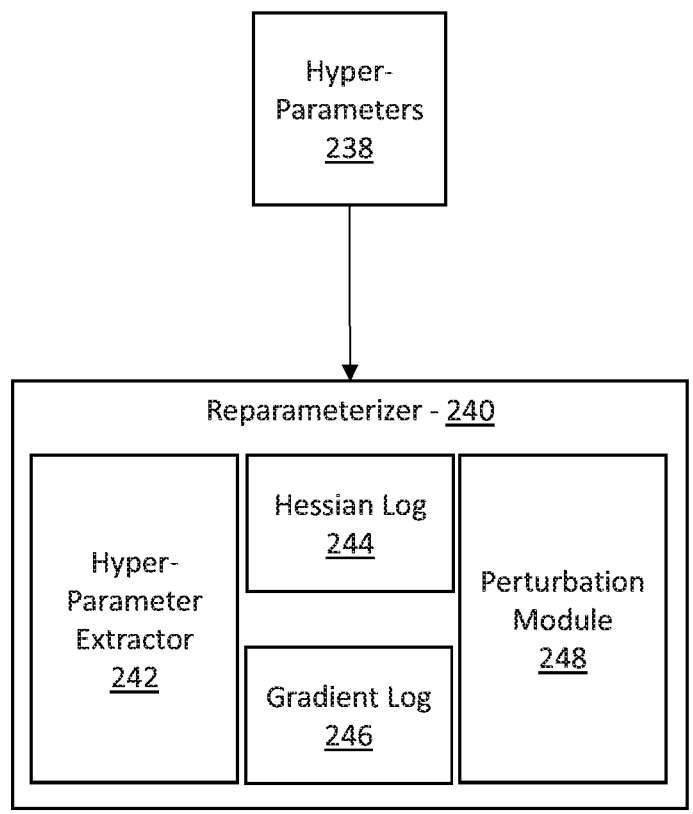
FIG. 5 is a diagram for reparameterizer to efficiently update parameters of a model in the behavior modelling system, in accordance with an embodiment of the present invention.

Referring now to FIG. 5, a diagram for a reparameterizer to efficiently update parameters of a model in the behavior modelling system is depicted according to an illustrative embodiment of the present invention.

Determining the negative gradient g and the Hessian H directly from equation 2 can by computationally expensive, e.g., can take $\Theta(n^2)$ computational resources to determine. Therefore, to reparameterize the loss L, as described above, a reparameterizer 240 implements a hyper-parameter extractor 242. The hyper-parameter extractor 242 pulls the hyper-parameter $\lambda$ from the loss function of equation 2 and applies it o a previous negative gradient g and previous Hessian H stored in a gradient log 246 and Hessian log 244, respectively. Thus, the reparameterizer 240 can reduce computational costs by basing a current negative gradient g and Hessian H off of the previous negative gradient g and the previous Hessian H.

However, applying the hyper-parameter to the previous negative gradient g and the previous Hessian H to provide a modified negative gradient g and a modified Hessian H may not provide an accurate current negative gradient g and Hessian H. Thus, each of modified negative gradient g and modified Hessian H can be refined using a rank-one update. The rank-one update is provided with the perturbation module 248 that applies a perturbator to each of the modified negative gradient g and the modified Hessian H for the rank-one update. As a result, a previous negative gradient g from the gradient log 246 and a previous Hessian H from the Hessian log 244 can be employed with the hyper-parameter $\lambda$ and perturbator to recursively provide a negative gradient g and Hessian H in an efficient manner. Thus, the reparameterizer 240 can reparameterize the loss function of equation 2 recursively using H and g as shown in equations 6 and 7 below:

$$g_t = \Sigma_{d=0}^{t-1} \gamma^d x_{t-d} y_{t-d} = \gamma g_{t-1} + x_t y_t, \qquad \text{Equation 6}$$

$$H_t = \Sigma_{d=0}^{t-1} \gamma^d x_{t-d} x_{t-d}^T = \gamma H_{t-1} + x_t x_t^T, \qquad \text{Equation 7}$$

where T denotes the transpose and $\gamma$ is a forgetting rate hyper parameter.

Figure 6:
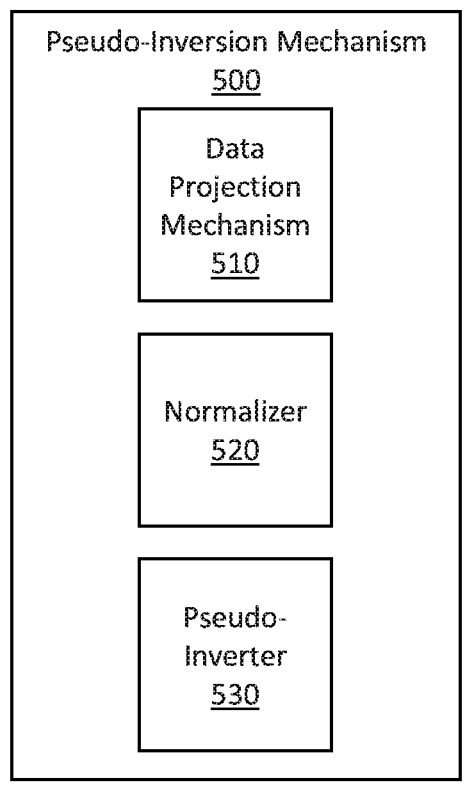
FIG. 6 is a diagram for a pseudo-inversion mechanism of the optimizer, in accordance with an embodiment of the present invention.

Referring now to FIG. 6, a diagram for a pseudo-inversion mechanism of the optimizer is depicted according to an illustrative embodiment of the present invention.

According to an embodiment of the present invention, recursive minimization of a model parameter is performed using a Hessian of a weighted mean square error function. However, recursive least squares can utilize the inverse of the Hessian. Where the Hessian is not invertible at a given time stamp the pseudo-inverse is used, including a rank-one update to the Hessian of the previous time stamp. Using the pseudo-inverse in this way improves the efficiency of recursive least squares by maintaining a $O(n^2)$ computational time.

As a result, a pseudo-inversion mechanism 500 is employed, such as, e.g., the pseudo-inversion mechanism 500 of the parameter updater 250 described above. The pseudo-inversion mechanism 500 includes a data projection mechanism 510, a normalizer 520 and a pseudo-inverter 530.

The data projection mechanism 510 generates a projection u corresponding to each data point $x_t$. The projection u is orthogonal to a kernel of the Hessian H of a previous time stamp. Where the projection u is not zero, then the projection u can be used to determine a rank one update for the pseudo-inverse rather than the data x.

As a result, where the projection u is not zero, the projection u can be normalized with a normalizer 520 to reduce the accumulation of error due to non-stationary behaviors. The normalizer 520 can normalize the projection u by, e.g., dividing the projection u by an inner product of the data x at the present time stamp and the projection u. However, the normalizer 520 can alternatively normalize the projection u but dividing the projection u by an inner product of the projection u with itself. However, the latter normalization technique can accumulate greater numerical error.

The pseudo-inverse of the Hessian H can then be determined using the normalized projection $u^+$ and the pseudo-inverse of the Hessian H at a previous time stamp. Thus, the pseudo-inverter 530 can recursively determine the pseudo-inverse of the Hessian H at the present time stamp with low accumulation in error while maintaining computation in $O(n^2)$ time. Thus, pseudo-inversion of the Hessian H for parameter optimization is simplified and made more efficient using the projection from a kernel of a previous pseudo-inverse of the Hessian H. In particular, the pseudo-inverter 530 can determine the pseudo-inverse according to, e.g., equation 8 below:

$$H_t^{-1} = H_{t-1}^{-1} - k(u^+)^T - (u^+)k^T + (1 + x_t^T k)(u^+)(u^+)^T, \qquad \text{Equation 8}$$

where $k = H_{t-1}^{-1} x_t$, $u^+$ is the normalized projection, and T indicates the transpose.

Where the projection u is equal to zero, the pseudo-inversion mechanism 530 can determine the pseudo-inverse of the Hessian H according to, e.g., equation 9 below:

$$H_t^{-1} = H_{t-1}^{-1} - \frac{kk^T}{(1 + x_t^T k)}, \qquad \text{Equation 9}$$

Thus, the pseudo-inversion mechanism 500 can provide the pseudo-inverse of the Hessian H according to the most computationally efficient method while preserving low accumulation of numerical error. As a result, the model parameter can be quickly, efficiently and accurately updated in an online manner while concurrently forming predictions for behavior in a next time-stamp.

Figure 7A:
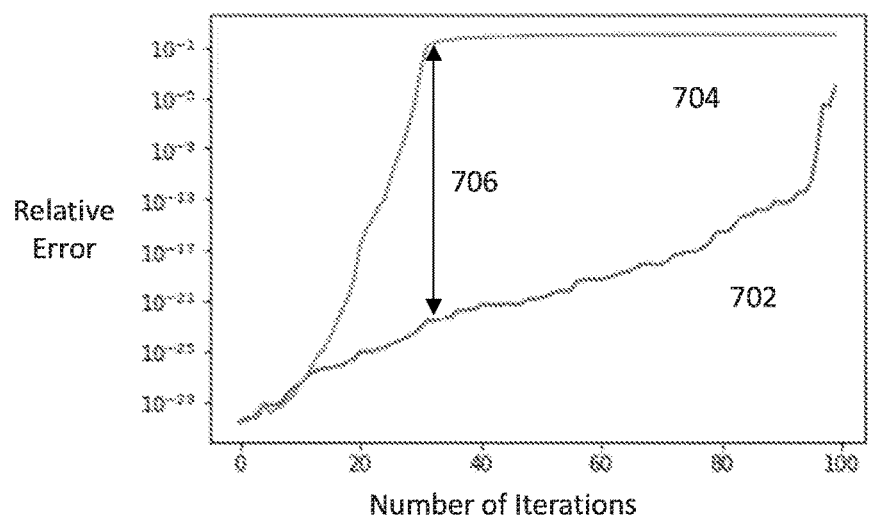
FIG. 7A is a plot of experimental findings of error accumulation in optimization of an industry behavior modelling system, in accordance with an embodiment of the present invention.

Referring now to FIG. 7A, a plot of experimental findings of error accumulation in optimization of an industry behavior modelling system is depicted according to an illustrative embodiment of the present invention.

According to aspects of the present embodiment, the pseudo-inverse of a 100 by 100 Hessian matrix has been implemented. In the 100 by 100 matrix, a pseudo-inversion mechanism implementing the orthogonal projection of a data vector for a rank-one update to the pseudo-inverse 702, as described above, such as, e.g., in reference to FIG. 6 above, results in an increase in accuracy 706 of relative error of about $10^{20}$ times as accurate as compared to a previous approach 704.

Figure 7B:
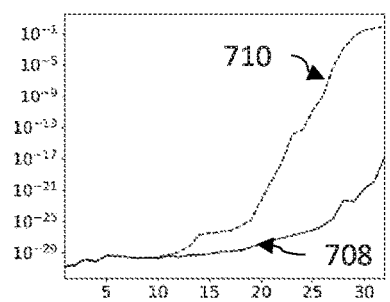
FIG. 7B is a plot of experimental findings of error accumulation in optimization of an industry behavior modelling system, in accordance with an embodiment of the present invention.

Referring now to FIG. 7B, a plot of experimental findings of error accumulation in optimization of an industry behavior modelling system is depicted according to an illustrative embodiment of the present invention.

According to aspects of the present embodiment, the pseudo-inverse of a 32 by 32 Hessian matrix has been implemented. In the 32 by 32 matrix, a pseudo-inversion mechanism implementing the orthogonal projection of a data vector for a rank-one update to the pseudo-inverse 708, as described above, such as, e.g., in reference to FIG. 6 above, results in an increase in accuracy of relative error as compared to a previous approach 710.

Figure 7C:
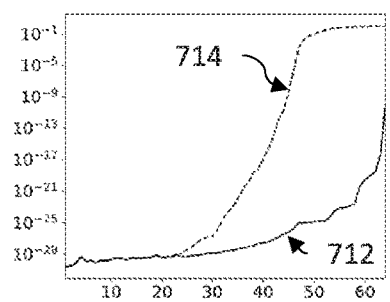
FIG. 7C is a plot of experimental findings of error accumulation in optimization of an industry behavior modelling system, in accordance with an embodiment of the present invention.

Referring now to FIG. 7C, a plot of experimental findings of error accumulation in optimization of an industry behavior modelling system is depicted according to an illustrative embodiment of the present invention.

According to aspects of the present embodiment, the pseudo-inverse of a 64 by 64 Hessian matrix has been implemented. In the 64 by 64 matrix, a pseudo-inversion mechanism implementing the orthogonal projection of a data vector for a rank-one update to the pseudo-inverse 712, as described above, such as, e.g., in reference to FIG. 6 above, results in an increase in accuracy of relative error as compared to a previous approach 714.

Figure 7D:
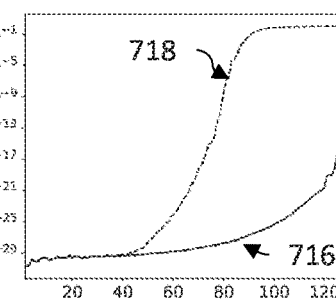
FIG. 7D is a plot of experimental findings of error accumulation in optimization of an industry behavior modelling system, in accordance with an embodiment of the present invention.

Referring now to FIG. 7D, a plot of experimental findings of error accumulation in optimization of an industry behavior modelling system is depicted according to an illustrative embodiment of the present invention.

According to aspects of the present embodiment, the pseudo-inverse of a 128 by 128 Hessian matrix has been implemented. In the 128 by 128 matrix, a pseudo-inversion mechanism implementing the orthogonal projection of a data vector for a rank-one update to the pseudo-inverse 716, as described above, such as, e.g., in reference to FIG. 6 above, results in an increase in accuracy of relative error as compared to a previous approach 718.

Figure 8:
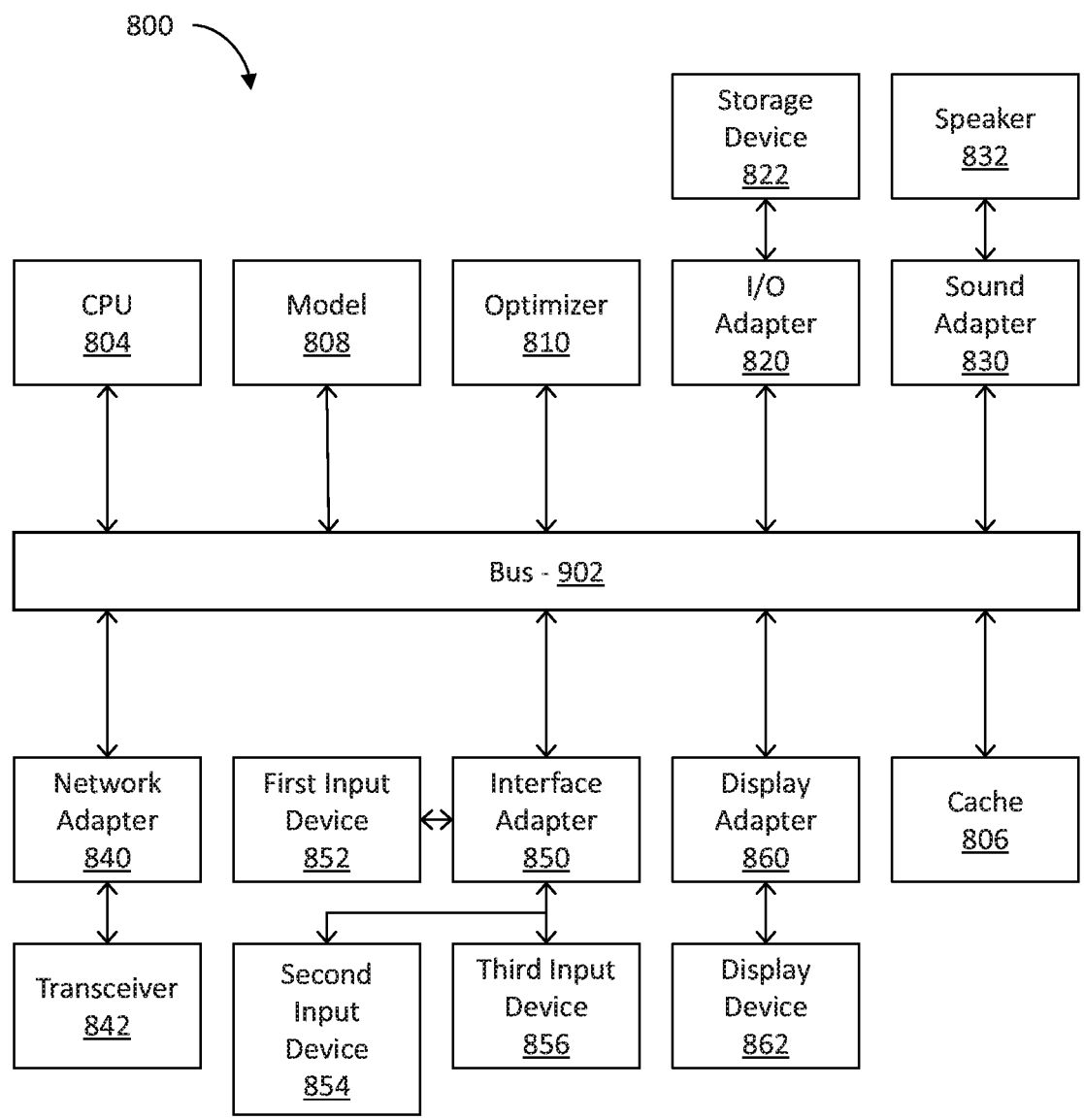
FIG. 8 is a block diagram showing an illustrative computing system, in accordance with an embodiment of the present invention.

Referring now to FIG. 8, an exemplary processing system 800 to which the present invention may be applied is shown in accordance with one embodiment. The processing system 800 includes at least one processor (CPU) 804 operatively coupled to other components via a system bus 802. A cache 806, an input/output (I/O) adapter 820, a sound adapter 830, a network adapter 840, a user interface adapter 850, and a display adapter 860, are operatively coupled to the system bus 802.

A storage device 822 is operatively coupled to system bus 802 by the I/O adapter 820. The storage device 822 can be any of a disk storage device (e.g., a magnetic or optical disk storage device), a solid state magnetic device, and so forth.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 852, 854, and 856 can be the same type of user input device or different types of user input devices. The user input devices 852, 854, and 856 are used to input and output information to and from system 800.

Of course, the processing system 800 may also include other elements (not shown), as readily contemplated by one of skill in the art, as well as omit certain elements. For example, various other input devices and/or output devices can be included in processing system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 800 are readily contemplated by one of ordinary skill in the art given the teachings of the present invention provided herein.

Moreover, according to an embodiment of the present invention, a model 808 is provided in communication with the bus 802. The model 808 can include, e.g., a memory device such as, e.g., random access memory (RAM), read only memory (ROM), a hard drive, a solid state drive, flash storage, a buffer, a cache, or other memory or storage device. The memory device includes software to implement the model 808 for performing time-series predictions of time-varying data according to data stored in the storage device 822 or received by the transceiver 842. For example, the model 808 can include the linear model 210 described above with reference to FIG. 4.

Similarly, an optimizer 810 is in communication with the bus 802. The optimizer 808 can include, e.g., a memory device such as, e.g., RAM, ROM, a hard drive, a solid state drive, flash storage, a buffer, a cache, or other memory or storage device. The memory device includes software to optimize parameters of the model 808. For example, the optimizer 810 can include, e.g. the optimizer 220 described above with reference to FIG. 4. The optimizer 810 dynamically adapts hyper-parameters such as, e.g., a regularization coefficient and a forgetting factor of a loss function to account for non-stationary behavior of the data used by the model 808. To improve the efficiency and maintain a computation time of $O(n^2)$, the optimizer 810 can include a pseudo-inversion mechanism, such as, e.g., the pseudo-inversion mechanism 500 described above that recursively determines a pseudo-inverse of a Hessian for recursive least squares regression of the model 808. As such, the optimization performed by the optimizer 810 can be performed in an online manner concurrently with modelling behavior of the data.

Figure 9:
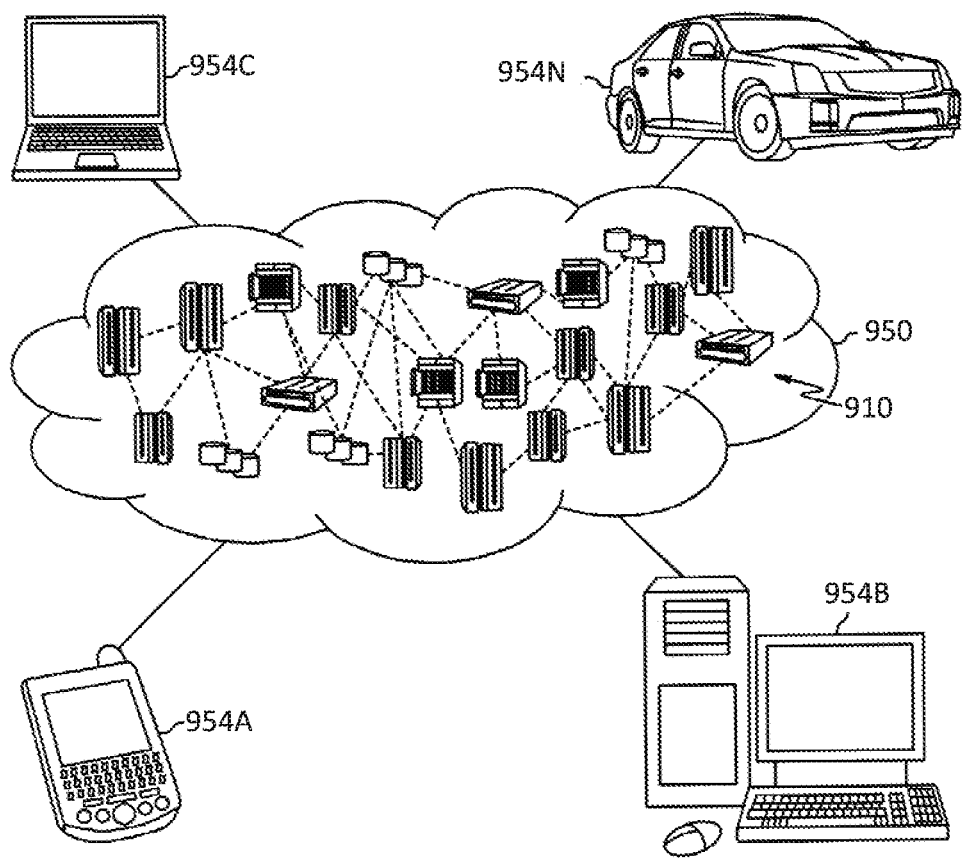
FIG. 9 is a block diagram showing an illustrative cloud computing environment having one or more cloud computing nodes with which local computing devices used by cloud consumers communicate in accordance with one embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
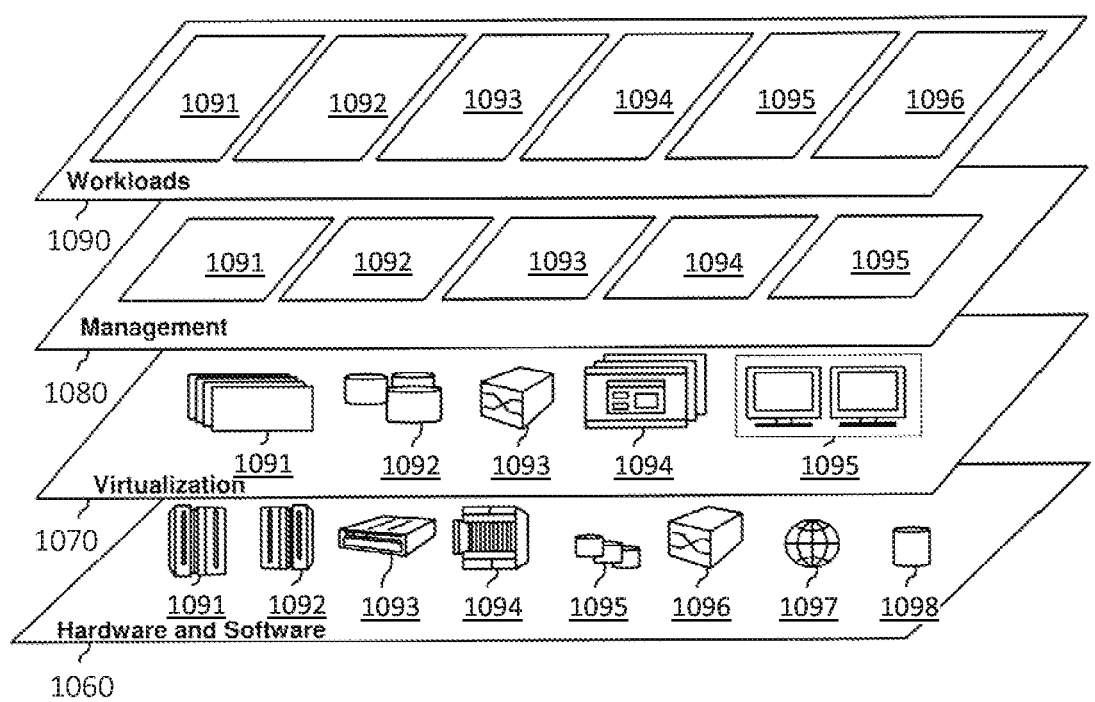
FIG. 10 is a block diagram showing a set of functional abstraction layers provided by a cloud computing environment in accordance with one embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a behavior modelling system 1096.

The behavior modelling system 1096 can include, e.g., the behavior modelling system 100 described above with reference to FIG. 1. As such, according to an embodiment of the present invention, a model and an optimizer is provided. The model can include, e.g., a memory device such as, e.g., random access memory (RAM), read only memory (ROM), a hard drive, a solid state drive, flash storage, a buffer, a cache, or other memory or storage device. The memory device includes software to implement the model for performing time-series predictions of time-varying data according to data stored in a storage device or received by a transceiver.

Similarly, the optimizer can include, e.g., a memory device such as, e.g., RAM, ROM, a hard drive, a solid state drive, flash storage, a buffer, a cache, or other memory or storage device. The memory device includes software to optimize parameters of the model. For example, the optimizer dynamically adapts hyper-parameters such as, e.g., a regularization coefficient and a forgetting factor of a loss function to account for non-stationary behavior of the data used by the model. To improve the efficiency and maintain a computation time of $O(n^2)$, the optimizer can include a pseudo-inversion mechanism, such as, e.g., the pseudo-inversion mechanism 500 described above that recursively determines a pseudo-inverse of a Hessian for recursive least squares regression of the model. As such, the optimization performed by the optimizer can be performed in an online manner concurrently with modelling behavior of the data.

Figure 11:
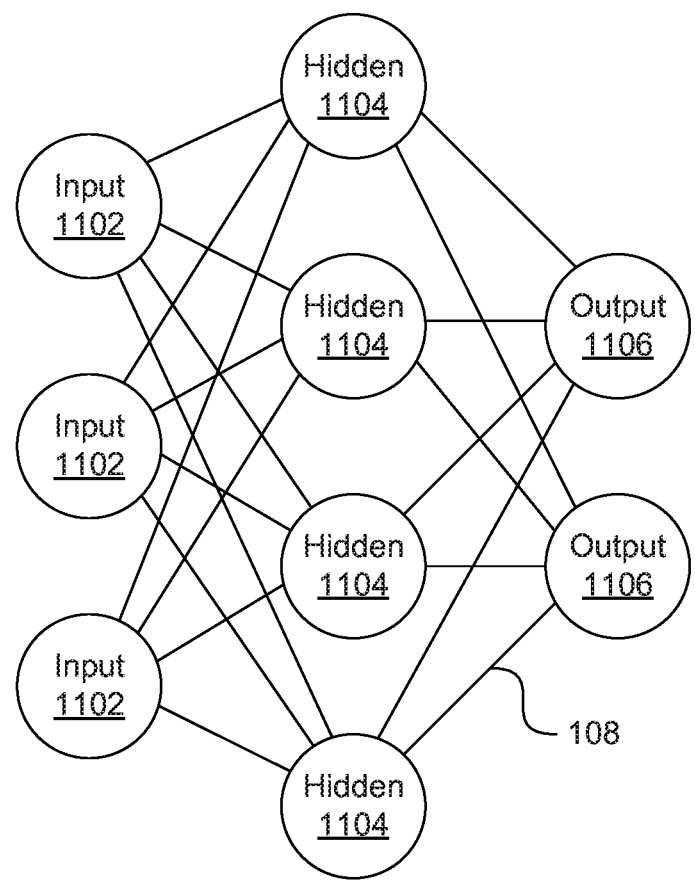
FIG. 11 is a generalized diagram of a neural network, in accordance with an embodiment of the present invention.

Referring now to FIG. 11, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 1102 that provide information to one or more "hidden" neurons 1104. Connections 1108 between the input neurons 1102 and hidden neurons 1104 are weighted and these weighted inputs are then processed by the hidden neurons 1104 according to some function in the hidden neurons 1104, with weighted connections 1108 between the layers. There may be any number of layers of hidden neurons 1104, and as well as neurons that perform different functions. There exist different neural network structures as well, such as convolutional neural network, maxout network, etc. Finally, a set of output neurons 1106 accepts and processes weighted input from the last set of hidden neurons 1104.

This represents a "feed-forward" computation, where information propagates from input neurons 1102 to the output neurons 1106. Upon completion of a feed-forward computation, the output is compared to a desired output available from training data. The error relative to the training data is then processed in "feed-back" computation, where the hidden neurons 1104 and input neurons 1102 receive information regarding the error propagating backward from the output neurons 1106. Once the backward error propagation has been completed, weight updates are performed, with the weighted connections 1108 being updated to account for the received error. This represents just one variety of ANN.

Figure 12:
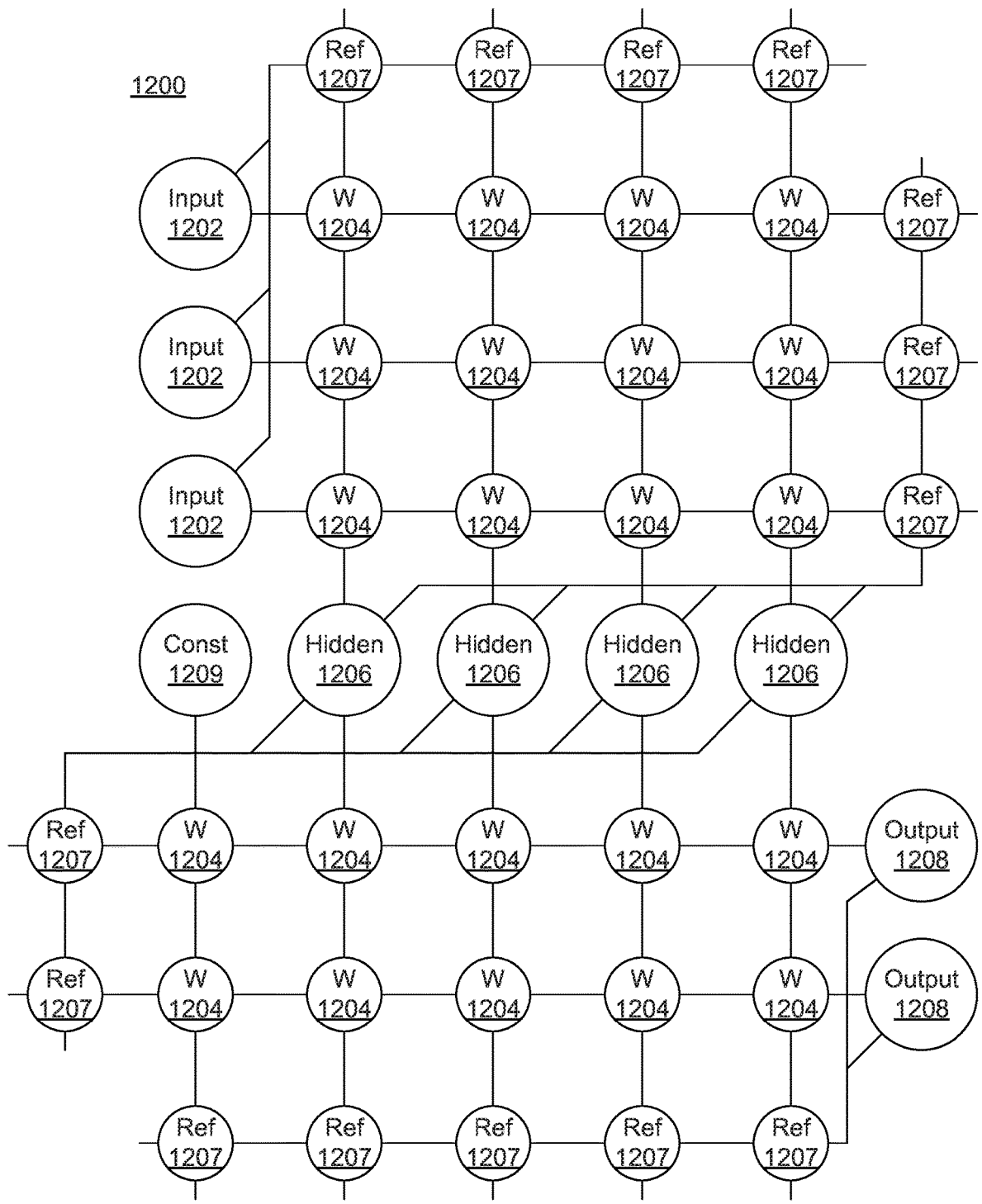
FIG. 12 is an artificial neural network (ANN) architecture, in accordance with an embodiment of the present invention.

Referring now to the drawings in which like numerals represent the same or similar elements and initially to FIG. 12, an artificial neural network (ANN) architecture 1200 is shown. It should be understood that the present architecture is purely exemplary and that other architectures or types of neural network may be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 1202 each provide an input voltage in parallel to a respective row of weights 1204. In the hardware embodiment described herein, the weights 1204 each have a settable resistance value, such that a current output flows from the weight 1204 to a respective hidden neuron 1206 to represent the weighted input. In software embodiments, the weights 1204 may simply be represented as coefficient values that are multiplied against the relevant neuron outputs.

Following the hardware embodiment, the current output by a given weight 1204 is determined as I=V/r, where V is the input voltage from the input neuron 1202 and r is the set resistance of the weight 204. The current from each weight adds column-wise and flows to a hidden neuron 1206. A set of reference weights 1207 have a fixed resistance and combine their outputs into a reference current that is provided to each of the hidden neurons 1206. Because conductance values can only be positive numbers, some reference conductance is needed to encode both positive and negative values in the matrix. The currents produced by the weights 1204 are continuously valued and positive, and therefore the reference weights 1207 are used to provide a reference current, above which currents are considered to have positive values and below which currents are considered to have negative values. The use of reference weights 1207 is not needed in software embodiments, where the values of outputs and weights can be precisely and directly obtained. As an alternative to using the reference weights 1207, another embodiment may use separate arrays of weights 1204 to capture negative values.

The hidden neurons 1206 use the currents from the array of weights 1204 and the reference weights 1207 to perform some calculation. The hidden neurons 1206 then output a voltage of their own to another array of weights 1204. This array performs in the same way, with a column of weights 1204 receiving a voltage from their respective hidden neuron 1206 to produce a weighted current output that adds row-wise and is provided to the output neuron 1208.

It should be understood that any number of these stages may be implemented, by interposing additional layers of arrays and hidden neurons 1206. It should also be noted that some neurons may be constant neurons 1209, which provide a constant output to the array. The constant neurons 1209 can be present among the input neurons 1202 and/or hidden neurons 1206 and are only used during feed-forward operation.

During back propagation, the output neurons 1208 provide a voltage back across the array of weights 1204. The output layer compares the generated network response to training data and computes an error. The error is applied to the array as a voltage pulse, where the height and/or duration of the pulse is modulated proportional to the error value. In this example, a row of weights 1204 receives a voltage from a respective output neuron 1208 in parallel and converts that voltage into a current which adds column-wise to provide an input to hidden neurons 1206. The hidden neurons 1206 combine the weighted feedback signal with a derivative of its feed-forward calculation and stores an error value before outputting a feedback signal voltage to its respective column of weights 1204. This back propagation travels through the entire network 1200 until all hidden neurons 1206 and the input neurons 1202 have stored an error value.

During weight updates, the input neurons 1202 and hidden neurons 1206 apply a first weight update voltage forward and the output neurons 1208 and hidden neurons 1206 apply a second weight update voltage backward through the network 1200. The combinations of these voltages create a state change within each weight 1204, causing the weight 1204 to take on a new resistance value. In this manner the weights 1204 can be trained to adapt the neural network 1200 to errors in its processing. It should be noted that the three modes of operation, feed forward, back propagation, and weight update, do not overlap with one another.

As noted above, the weights 1204 can be implemented in software or in hardware, for example using relatively complicated weighting circuitry or using resistive cross point devices. Such resistive devices may have switching characteristics that have a non-linearity that can be used for processing data. The weights 1204 may belong to a class of device called a resistive processing unit (RPU), because their non-linear characteristics are used to perform calculations in the neural network 1200. The RPU devices may be implemented with resistive random access memory (RRAM), phase change memory (PCM), programmable metallization cell (PMC) memory, or any other device that has non-linear resistive switching characteristics. Such RPU devices may also be considered as memristive systems.

Figure 13:
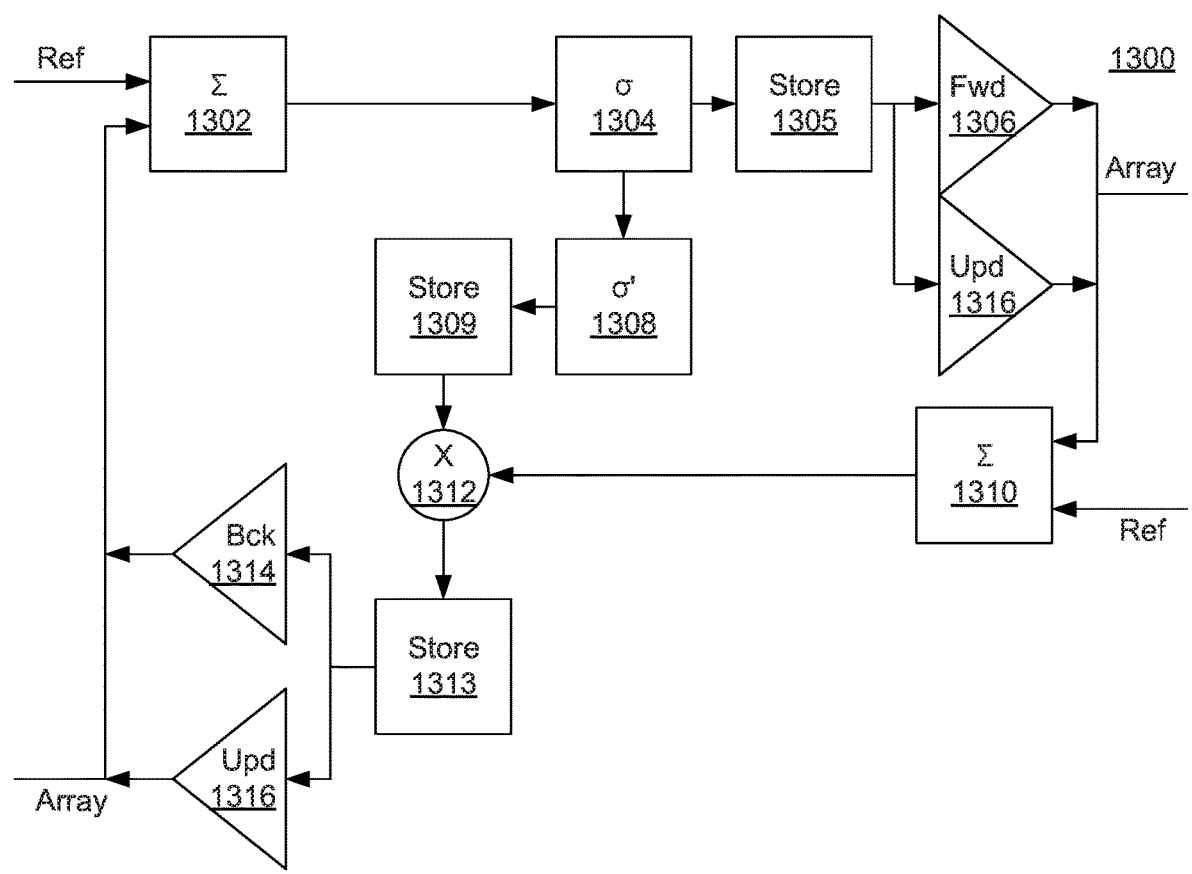
FIG. 13 is a block diagram of a neuron, in accordance with an embodiment of the present invention.

Referring now to FIG. 13, a block diagram of a neuron 1300 is shown. This neuron may represent any of the input neurons 1202, the hidden neurons 1206, or the output neurons 1208. It should be noted that FIG. 13 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 1300 to handle switching between modes.

In feed forward mode, a difference block 1302 determines the value of the input from the array by comparing it to the reference input. This sets both a magnitude and a sign (e.g., + or −) of the input to the neuron 1300 from the array. Block 1304 performs a computation based on the input, the output of which is stored in storage 1305. It is specifically contemplated that block 1304 computes a non-linear function and may be implemented as analog or digital circuitry or may be performed in software. The value determined by the function block 304 is converted to a voltage at feed forward generator 1306, which applies the voltage to the next array. The signal propagates this way by passing through multiple layers of arrays and neurons until it reaches the final output layer of neurons. The input is also applied to a derivative of the non-linear function in block 1308, the output of which is stored in memory 1309.

During back propagation mode, an error signal is generated. The error signal may be generated at an output neuron 1208 or may be computed by a separate unit that accepts inputs from the output neurons 1208 and compares the output to a correct output based on the training data. Otherwise, if the neuron 1300 is a hidden neuron 1206, it receives back propagating information from the array of weights 1204 and compares the received information with the reference signal at difference block 1310 to provide a continuously valued, signed error signal. This error signal is multiplied by the derivative of the non-linear function from the previous feed forward step stored in memory 1309 using a multiplier 1312, with the result being stored in the storage 1313. The value determined by the multiplier 1312 is converted to a backwards propagating voltage pulse proportional to the computed error at back propagation generator 1314, which applies the voltage to the previous array. The error signal propagates in this way by passing through multiple layers of arrays and neurons until it reaches the input layer of neurons 1202.

During weight update mode, after both forward and backward passes are completed, each weight 1204 is updated proportional to the product of the signal passed through the weight during the forward and backward passes. The update signal generators 1316 provide voltage pulses in both directions (though note that, for input and output neurons, only one direction will be available). The shapes and amplitudes of the pulses from update generators 1316 are configured to change a state of the weights 1204, such that the resistance of the weights 1204 is updated.

Figure 14:
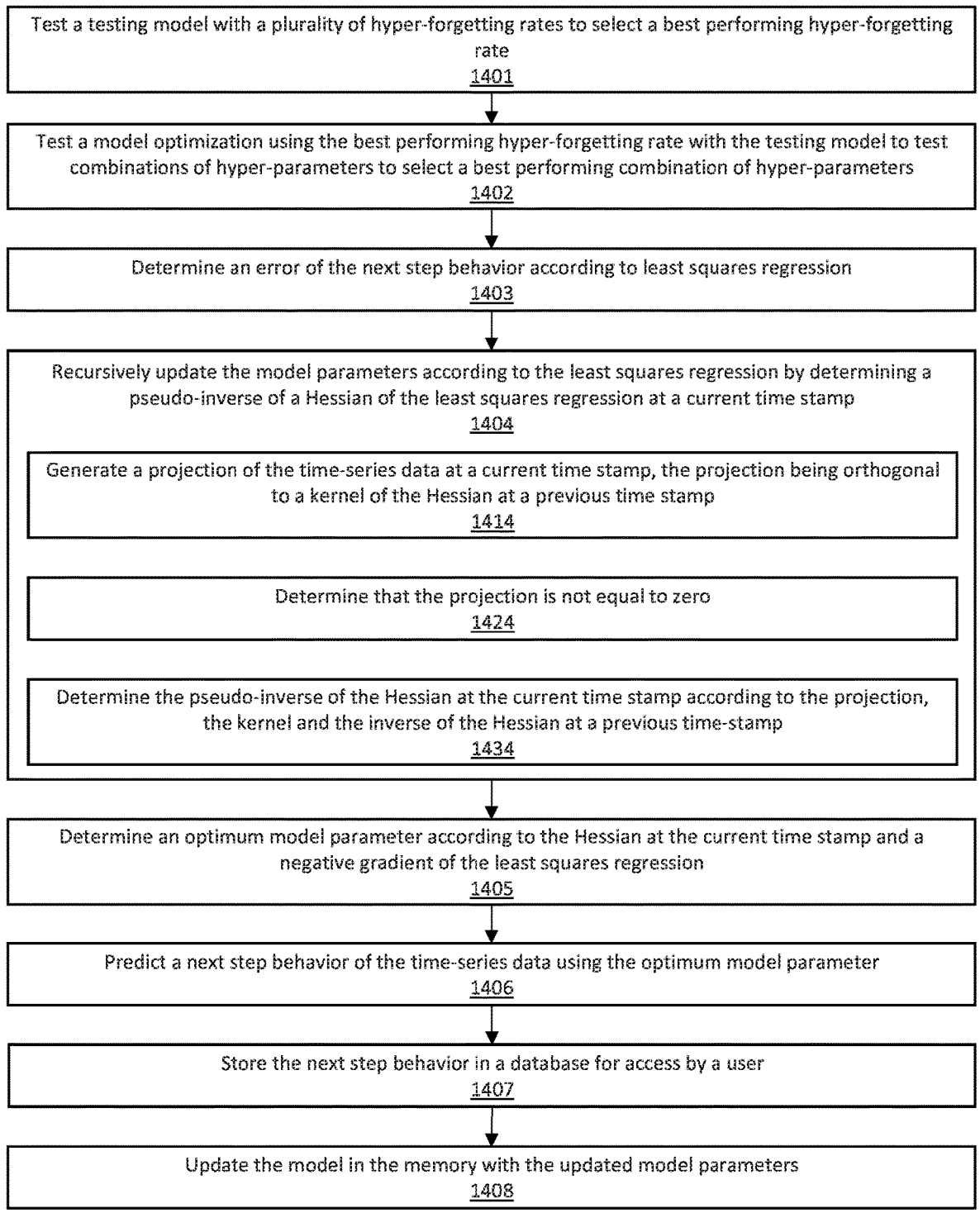
FIG. 14 is a block/flow diagram showing a system/method of industry data prediction with model optimization using recursive pseudo-inversion, in accordance with an embodiment of the present invention.

Referring now to FIG. 14, a block/flow diagram showing a system/method of industry data prediction with model optimization using recursive pseudo-inversion is depicted according to an illustrative embodiment of the present invention.

At block 1401, test a testing model with a plurality of hyper-forgetting rates to select a best performing hyper-forgetting rate.

At block 1402, test a model optimization using the best performing hyper-forgetting rate with the testing model to test combinations of hyper-parameters to select a best performing combination of hyper-parameters.

At block 1403, determine an error of the next step behavior according to least squares regression.

At block 1404, recursively update the model parameters according to the least squares regression by determining a pseudo-inverse of a Hessian of the least squares regression at a current time stamp.

At block 1414, determine the pseudo-inverse including generate a projection of the time-series data at a current time stamp, the projection being orthogonal to a kernel of the Hessian at a previous time stamp.

At block 1424, determine the pseudo-inverse including determining that the projection is not equal to zero.

At block 1434, determine the pseudo-inverse including determining the pseudo-inverse of the Hessian at the current time stamp according to the projection, the kernel and the inverse of the Hessian at a previous time-stamp.

At block 1405, determine an optimum model parameter according to the Hessian at the current time stamp and a negative gradient of the least squares regression.

At block 1406, predict a next step behavior of the time-series data using the optimum model parameter.

At block 1407, store the next step behavior in a database for access by a user.

At block 1408, update the model in the memory with the updated model parameters.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for training a neural network for modelling time-series data, the method comprising:
    inputting time-series data into the neural network to train a testing model including a plurality of model parameters;
    evaluating the testing model utilizing a plurality of hyper-forgetting rates;
    selecting a best performing hyper-forgetting rate from the plurality of hyper-forgetting rates;
    testing a model optimization using the best performing hyper-forgetting rate with the testing model to test combinations of hyper-parameters for training the neural network;
    selecting a best performing combination of hyper-parameters for training the neural network;
    determining an error of the testing model using the model optimization with the best performing hyper-parameters;
    recursively updating the model parameters of the neural network according to the least squares regression by determining a pseudo-inverse of a Hessian of the least squares regression at a current time stamp according to a projection of the time-series data at the current time stamp and the pseudo-inverse of the Hessian at a previous time-stamp to determine optimum model parameters;
    predicting a next step behavior of the time-series data using the optimum model parameters; and
    storing the next step behavior in a database for access by a user.

2. The method as recited in claim 1, wherein the projection is normalized according to an inner product of the projection and the industrial data.

3. The method as recited in claim 1, wherein the projection is orthogonal to a kernel of the Hessian at the previous time-stamp.

4. The method as recited in claim 1, further comprising determining that the projection is not equal to zero.

5. The method as recited in claim 4, further comprising determining the pseudo-inverse of the Hessian of the current time stamp according to the kernel of the pseudo-inverse of the Hessian of the previous time stamp and the industrial data at the current time stamp where the projection is equal to zero.

6. The method as recited in claim 1, further comprising determining a kernel of the Hessian from the previous time stamp according to the pseudo-inverse of the Hessian from the previous time stamp and the industrial data at the current time stamp.

7. The method as recited in claim 1, wherein the industrial data includes stock behavior through time gathered from a financial database.

8. The method as recited in claim 1, wherein the industrial data includes agricultural yields through time.

9. The method as recited in claim 1, wherein the testing model includes a linear model.

10. The method as recited in claim 1, further comprising:
evaluating an error of the testing model according to the cumulative squared error using multiple forgetting rates; and
selecting a forgetting rate having the lowest cumulative squared error to update the model parameters with forgetting rate adaptation.

11. A method for training a neural network for modelling time-series data, the method comprising:
inputting time-series data into the neural network to train a testing model including a plurality of model parameters;
evaluating the testing model utilizing a plurality of hyper-forgetting rates to select a best performing hyper-forgetting rate from the plurality of hyper-forgetting rates;
testing a model optimization using the best performing hyper-forgetting rate with the testing model to test combinations of hyper-parameters for training the neural network to select a best performing combination of hyper-parameters for training the neural network;
determining an error of the testing model using the model optimization with best performing hyper-parameters according to least squares regression;
recursively update the model parameters of the neural network according to the least squares regression by determining a pseudo-inverse of a Hessian of the least squares regression at a current time stamp, including:
generating a projection of the time-series data at a current time stamp, the projection being orthogonal to a kernel of the Hessian at a previous time stamp;
determining that the projection is not equal to zero;
determining the pseudo-inverse of the Hessian at the current time stamp according to the projection, the kernel and the inverse of the Hessian at a previous time-stamp;
determining optimum model parameters according to the Hessian at the current time stamp and a negative gradient of the least squares regression;
predicting a next step behavior of the time-series data using the optimum model parameters;
storing the next step behavior in a database for access by a user; and
updating the model in the memory with the updated model parameters.

12. The method as recited in claim 11, wherein the projection is normalized according to an inner product of the projection and the time-series data.

13. The method as recited in claim 1, further comprising determining the pseudo-inverse of the Hessian of the current time stamp according to the kernel of the pseudo-inverse of the Hessian of the previous time stamp and the industrial data at the current time stamp where the projection is equal to zero.

14. The method as recited in claim 11, further comprising determining a kernel of the Hessian from the previous time stamp according to the pseudo-inverse of the Hessian from the previous time stamp and the industrial data at the current time stamp.

15. The method as recited in claim 11, wherein the time-series data includes stock behavior through time gathered from a financial database.

16. The method as recited in claim 11, further comprising:
evaluating an error of the testing model according to the cumulative squared error using multiple forgetting rates; and
selecting a forgetting rate having the lowest cumulative squared error to update the model parameters with forgetting rate adaptation.

17. A system for training a neural network for modelling time-series data, the system comprising:
inputting time-series data into the neural network to train a testing model including a plurality of model parameters;
a testing model to test a plurality of hyper-forgetting rates, select a best performing hyper-forgetting rate from the plurality of hyper-forgetting rates, test a model optimization using the best performing hyper-forgetting rate with the testing model to test combinations of hyper-parameters and select a best performing combination of hyper-parameters;
an optimization system to determine an error of a testing model stored in memory using the best performing hyper-parameters;
a parameter updater to recursively update the model parameters of the neural network according to the least squares regression by determining a pseudo-inverse of a Hessian of the least squares regression at a current time stamp using a pseudo-inversion mechanism according to a projection of the time-series data at the current time stamp and the pseudo-inverse of the Hessian at a previous time-stamp to determine optimum model parameters and updated the linear model in the memory with the updated model parameters;
a behavior modeler that predicts a next step behavior of the time-series data according to the updated model parameters; and
a database in communication with the memory and the parameter updater to store the next step behavior in a database for access by a user.

18. The system as recited in claim 17, further including a cloud network in communication with the database to communicate the time-series data and the predicted behavior to a user.

19. The system as recited in claim 17, wherein the model includes a linear model.

20. The system as recited in claim 17, wherein the industrial data includes stock behavior through time gathered from a financial database.

* * * * *